Oct. 14, 1930.  J. WEGNER  1,778,132
STONE WORKING MACHINE
Filed Oct. 10, 1927   2 Sheets-Sheet 1
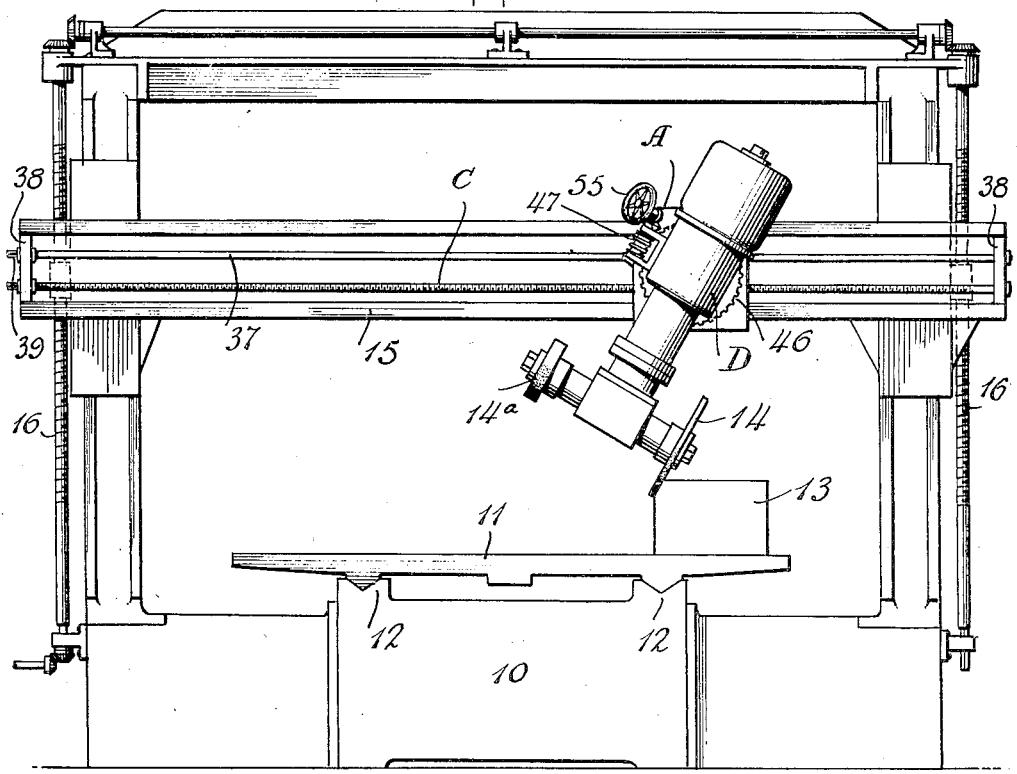
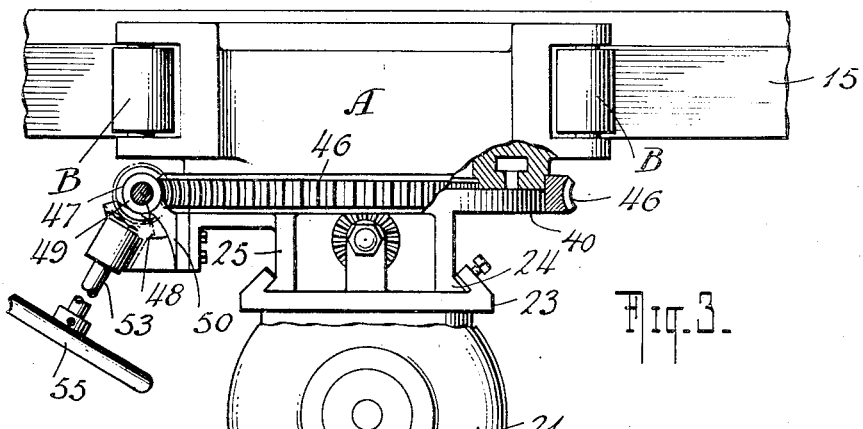
INVENTOR
JULIUS WEGNER
BY
ATTORNEYS Oct. 14, 1930.                J. WEGNER                 1,778,132
                       STONE WORKING MACHINE
                      Filed Oct. 10, 1927          2 Sheets-Sheet 2
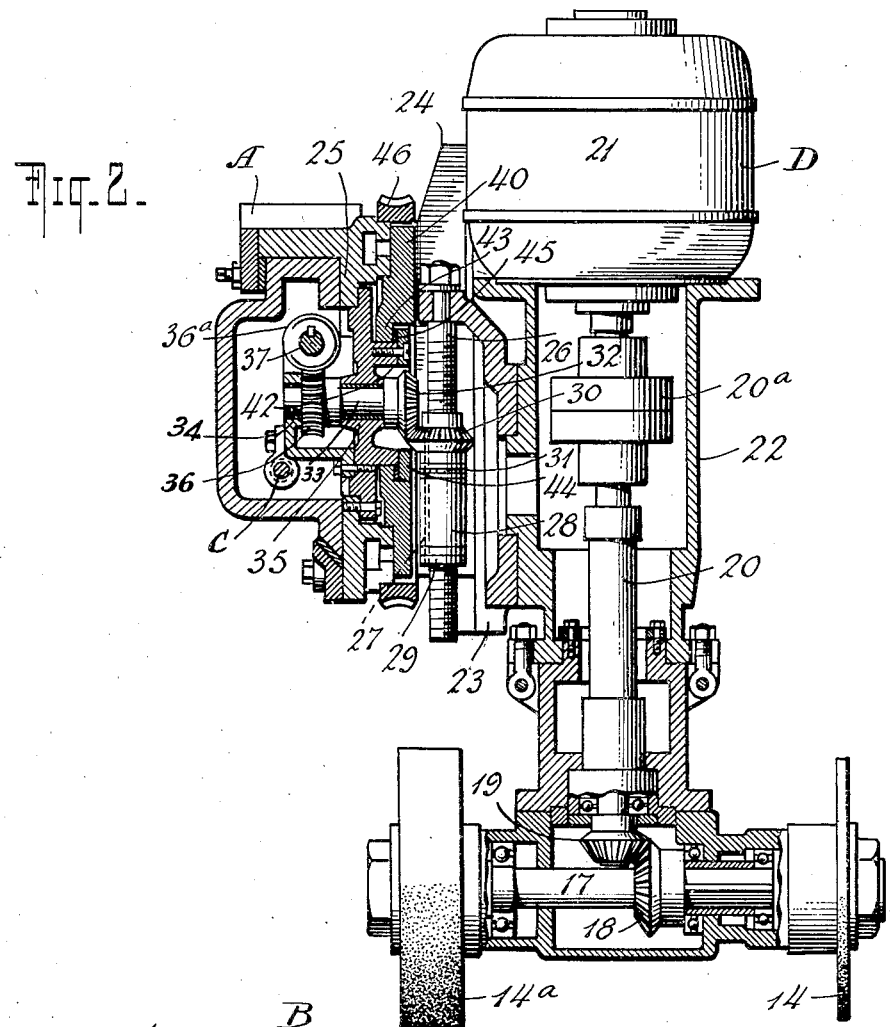
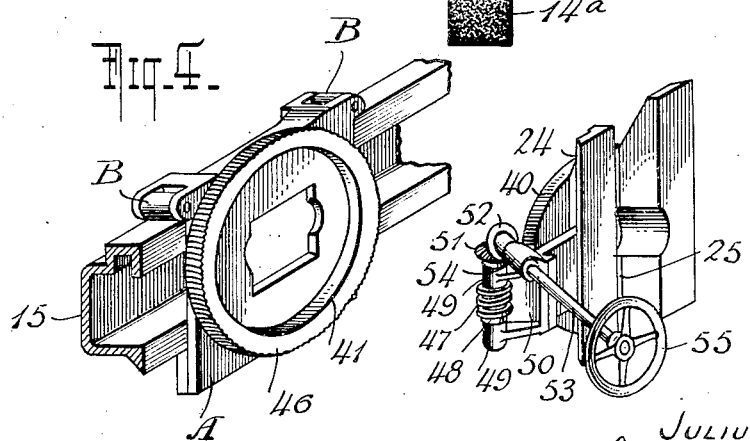
INVENTOR
JULIUS WEGNER
BY
ATTORNEYS Patented Oct. 14, 1930

1,778,132

UNITED STATES PATENT OFFICE

JULIUS WEGNER, OF ASTORIA, NEW YORK

STONE-WORKING MACHINE

Application filed October 10, 1927. Serial No. 225,070.

The invention relates to stone working machines and more particularly to that class of such machines in which the cutting or other tool is carried by a swivelled head, capable of being adjusted to angular positions to thereby set the tool in operative positions which are oblique or inclined with respect to the work. Such machines generally include a horizontally shiftable carriage carrying a vertically adjustable slide on which the head is swivelled, so that adjustments of the tool as the operation thereof on the work progresses are made by shifting the slide in vertical directions. When the tool is operating for instance to effect an angular cut on the work, this means that each time a vertical adjustment of the slide is made to bring the tool to an advanced cutting position, the carriage must be also adjusted to bring the tool back into proper operating relation to the previously made cut, so that the desired continuation of the latter may be properly effected. The object of the present invention is to provide a novel and simple construction whereby the necessity for such double adjustment is avoided and a direct progressive feed of the cutting tool or its equivalent is possible, in exact accordance with predetermined angular direction of the cut or equivalent operative effect of said tool. Other objects will appear from the description hereinafter and the features of novelty will be pointed out in the claims.

In the accompanying drawings, which illustrate an example of the invention without defining its limits, Fig. 1 is a diagrammatic front elevation of a planer type of stone working machine for which the improved construction is particularly adapted; Fig. 2 is an elevation independent of the machine and partly in section showing the head construction in detail; Fig. 3 is a plan view thereof, and Fig. 4 is a view showing the swivelling elements in separate, disconnected relation.

In order to simplify the specification as much as possible, the invention is described in connection with a stone working machine of the planer type, adjusted to cut a block of stone at an angle, as shown diagrammatically in Fig. 1. It will of course be understood that the novel features are equally well adapted for use in connection with tools which produce effects upon the work other than a mere cut, and in combination with machines other than stone working machines, which provide for the angular setting of the operating tool and the description and claims are to be construed accordingly.

In its illustrated form the machine comprises the customary frame 10 and a horizontally movable table 11, arranged to travel on tracks 12 for shifting the work 13 relatively to the operating tool 14, which is shown in the form of a cutting disc of abrasive material. The machine further includes the usual cross-rail 15 vertically adjustable on the frame 10 by means of hoisting screws 16 operated in the conventional manner to adjust the entire mechanism vertically with respect to the table 11, and relatively to the usual carriage A which is mounted by means of rollers B on the cross-rail so as to be adjustable lengthwise thereof by means of the customary screw C journalled upon said cross rail 15 and either manually or mechanically operated as may be preferred. The aforesaid tool 14 is carried by a shaft 17 which may also carry an additional tool 14ª and is driven by means of bevel gears 18 and 19 located respectively on the shaft 17 and on a vertical drive shaft 20 connected by means of a coupling 20ª with an electric motor 21. The latter is carried by a column like housing 22 through which the shaft 20 extends and at the lower end of which the tool shaft 17 is journalled. With this arrangement the housing 22, the motor 21, the vertical shaft 20 and the tool shaft 17 with the tool 14 constitute a unit D which is provided, either as a separate element or as an integral part, with a slide member 23 slidably mounted upon guides 24 comprising part of a swivel member 25. Although the novel feature of the present construction consists in providing for the independent adjustment of the unit D, the specific construction of the mechanism whereby this is accomplished may be of any suitable construction. In the illustrated example the means for adjusting the unit D lengthwise of the guides 24 to thereby adjust the tool 14 relatively to the work in a manner to keep pace with the progress of the operation of said tool, is shown in the form of an adjusting or feed screw 26, rigidly fixed upon a suitable part of the slide member 23 and extending through a tubular or sleeve nut 27 in screwthreaded engagement therewith, said nut 27 being rotatably mounted in a bearing 28 and fixed therein against relative axial movement by means of one or more nuts 29 threaded upon the lower end of said tubular nut and abutting the bearing 28. Keyed to the upper end of the sleeve nut 27 is a bevel gear 30, the thrust of which is taken up by ball bearings 31 and which meshes with a bevel gear 32 fixed upon a short counter shaft 33 journalled in bearings 34 and 35 carried by the carriage A. A worm gear 36 is keyed upon the counter shaft 33 between the bearings 34 and 35 and meshes with a worm 36ª slidably splined on a shaft 37 journalled in bearings 38 on the cross rail 15 as shown in Fig. 1; the shaft 37 may be provided at its one end with a squared head 39 for the accommodation of a suitable tool for manually rotating said shaft 37, or the latter may be arranged for mechanical operation in any convenient manner.

The swivelling of the head may be accomplished in any well known or special manner, and may comprise the arrangement shown in the illustrated example. In the latter, the swivel member 25 is provided with a circular bearing 40 dimensioned to fit into a circular recess 41 with which the carriage A is provided and which is concentric to the counter shaft 33, the bearing 35 of which includes a hub 42 extending through an opening formed in the slide member 23 and constituting a bearing for an annular flange 43 thereof. To maintain the parts in proper connection with each other a washer 44 is bolted or otherwise secured to the aforesaid hub 42 so as to project over the annular flange 43, a spacer 45 being preferably located between said washer 44 and the flange 43 as shown in Fig. 2.

To rotate the swivel member 23 and with it the unit D for the purpose of setting the tool 14 in position to cut at any angle or otherwise, a worm gear segment or ring 46 is bolted or otherwise secured to the carriage A as clearly shown in Figs. 2 and 4. The swivelling mechanism, as shown in Fig. 4, consists of a worm 47 meshing with the segment 46 and mounted upon a shaft 48 which is journalled in bearings 49 forming part of a bracket 50; the latter being bolted or otherwise fastened to the swivel member 25. The shaft 48 also carries a bevel gear 51 which meshes with a bevel gear 52 fixed upon a shaft 53 rotatably mounted in a bearing 54 forming part of the bracket 50; to facilitate the operation of the shaft 53, a hand wheel 55 or equivalent device is secured thereon as shown in Fig. 4.

From the above description it will be seen that as the hand wheel 55 or its equivalent is operated to turn the shaft 53, the movement of the latter will be transmitted by the bevel gears 52 and 51 to the worm 47, which being in mesh with the relatively fixed segment 46 will thereby be caused to travel along or about said segment. The swivel member 25 will accordingly be rotatably adjusted about the shaft 33 as a centre and consequently will adjust the unit D and with it the tool 14 to any angular or other position desired. To adjust the tool 14, for instance into the cut which is being made thereby or in other words to feed the tool 14 relatively to the work in a manner to keep pace with the progress of the cut as to depth, the shaft 37 is operated either manually or mechanically as the case may be. This brings about a rotation of the worm 36ª and the worm gear 36 and accordingly rotates the short counter shaft 33 and with it the bevel gear 32; the latter in turn operates the bevel gear 30 and the tubular or sleeve nut 27. This nut being fixed against movement in axial directions will accordingly raise or lower the screw 26 and consequently will shift the unit D along the guides 24 of the swivel member 25 and thereby will feed the tool 14 into the cut or relatively to the work 13 in accordance with the progress of the operation being performed by said tool. Similarly the parts may be operated to adjust the tool 14 relatively to the work in a direction opposite to the active operative feed thereof. In any case the feeding of the tool 14 in accordance with the progress of the operation thereof may be accomplished regardless of the position of the unit D or the angle of inclination at which it is set. It will be understood that the progressive operation of the tool 14 lengthwise of the work 13 is taken care of by the shifting of the table 11 along the tracks 12, and that the feeding of the tool 14 in a direction which may for convenience be termed transverse to the work 13 is accomplished by shifting the unit D in the manner set forth above, this latter operation being possible in any position, angular or otherwise, of said unit D.

In stone working machines of the class referred to which include two or more swivel heads mounted upon the cross rails 15, the shafts C and 37 will have to correspond in numbers to the number of heads included in the particular machine, in order to provide for the independent operation of the mechanisms above described and which in such case would be duplicated in each head.

Various changes in the specific form shown and described may be made within the scope of the claims without departing from the spirit of the invention.

I claim:

1. In a machine of the kind described, the combination of a movable carriage, a curved bearing member fixed on said carriage, a swivel member having a circular member rotatably mounted within the curved member of said carriage, a unit carried by said swivel member and adjustable linearly in directions transverse to the swivelling axis of said swivel member and relatively to the latter, said unit including an operating tool adjustable therewith, co-operating means on said curved bearing member and said swivel member whereby the latter is rotatably adjusted to set said unit at any desired angle, and independent means on said carriage and unit for linearly adjusting the latter relatively to said swivel member in any position of said unit.

2. In a machine of the kind described, the combination of a movable carriage, an annular bearing member fixed on said carriage, a circular bearing rotatably fitted within said bearing member, and provided with a worm gear on its outer periphery, guiding means on said circular bearing, a unit slidably mounted on said guiding means for linear adjustments relatively to said carriage, and including a tool rotatable about an axis tangent to the swivelling path, swivelling mechanism including a worm in mesh with said worm gear whereby said unit is set at any desired angle, and independent means whereby said unit is linearly adjusted in any of its positions to shift said tool in directions which intersect said swivelling path.

3. In a stone-working machine including a travelling table for supporting the work, and a cross-rail extending transversely of said table and vertically adjustable toward and away from the same, the combination of a carriage mounted on said cross-rail to travel lengthwise thereof and provided with a circular recess extending about a horizontal axis, a swivel member mounted within the recess of said carriage and rotatable about said horizontal axis, a unit carried by said swivel member and partaking of the swivelling movements thereof, said unit including a tool rotatable about an axis tangent to the swivelling path of the unit, and mechanism for operating said tool, swivelling means curved about said recess, co-operating means on said swivel member cooperating with said swivelling means and unit whereby the latter is movable linearly in directions transverse to the swivelling axis of said swivel member and relatively thereto, mechanism co-operating with said swivelling means whereby said swivel member is rotatably adjusted to set said unit and with it said tool at any desired angle, and independent means for linearly adjusting said unit relatively to said swivel member in any position of said unit.

4. In a stone-working machine including a travelling table for supporting the work, and a cross-rail extending transversely of said table and vertically adjustable toward and away from the same, the combination of a carriage mounted on said cross-rail to travel lengthwise thereof and provided with a circular recess, a swivel member mounted within the circular recess of said carriage and rotatable about a horizontal axis, a unit carried by said swivel member and partaking of the swivelling movements thereof, said unit including a tool rotatable about an axis tangent to the swivelling path of the unit, mechanism for operating said tool, co-operating means on said swivel head and unit whereby the latter is movable linearly in directions transverse to the swivelling axis of said swivelling member and relatively thereto, mechanism whereby said swivel member is rotatably adjusted to set said unit and with it said tool at any desired angle, a feed screw fixed upon said unit, a sleeve nut rotatably mounted on said carriage in threaded engagement with said screw and fixed against movement in axial directions, and means for rotating said sleeve nut relatively to said screw to thereby shift said unit in any of its adjusted positions in directions which intersect the swivelling path.

In testimony whereof I have hereunto set my hand.

JULIUS WEGNER.